(12) United States Patent
Mittag et al.

(10) Patent No.: US 7,744,811 B2
(45) Date of Patent: Jun. 29, 2010

(54) FURNACE EXPANSION JOINT WITH COMPRESSIBLE GRAPHITE JOINT FILLER AND MANUFACTURING METHOD

(75) Inventors: Jörg Mittag, Wiesbaden (DE); Oswin Öttinger, Meitingen (DE)

(73) Assignee: SGL Carbon SE, Wiesbaden (DE)

(*) Notice: Subject to any disclaimer, the term of this patent is extended or adjusted under 35 U.S.C. 154(b) by 0 days.

(21) Appl. No.: 11/825,080

(22) Filed: Jul. 2, 2007

(65) Prior Publication Data

US 2007/0267789 A1  Nov. 22, 2007

Related U.S. Application Data

(63) Continuation of application No. PCT/EP2005/013948, filed on Dec. 22, 2005.

(30) Foreign Application Priority Data

Dec. 30, 2004  (EP) .................... 04031020

(51) Int. Cl.
 *C21B 7/06* (2006.01)
(52) U.S. Cl. ............... 266/285; 266/286
(58) Field of Classification Search ............ 266/280, 266/283, 286, 285
See application file for complete search history.

(56) References Cited

U.S. PATENT DOCUMENTS

| 3,404,061 A | | 10/1968 | Shane et al. |
| 4,146,401 A | | 3/1979 | Yamada et al. |
| 4,454,190 A | | 6/1984 | Katagiri |
| 5,358,223 A | * | 10/1994 | Bleijendaal et al. ......... 266/138 |
| 2006/0220320 A1 | | 10/2006 | Potier et al. |
| 2007/0267789 A1 | * | 11/2007 | Mittag et al. ................ 266/285 |

FOREIGN PATENT DOCUMENTS

| DE | 2 240 886 | 2/1974 |
| EP | 0 300 064 B1 | 4/1991 |
| GB | 1 389 367 | 4/1975 |
| JP | 6-109717 | 4/1994 |
| WO | WO 2004/063612 A2 | 7/2004 |

\* cited by examiner

*Primary Examiner*—Scott Kastler
(74) *Attorney, Agent, or Firm*—Laurence A. Greenberg; Werner H. Stemer; Ralph E. Locher

(57) ABSTRACT

Expansion joints located in the upper part of the hearth walls of a reduction furnace are filled with a plate-shaped compressible graphite filler having a density of 0.1 to 0.2 $g/cm^3$. A method of manufacturing such a joint filler is also provided.

12 Claims, 2 Drawing Sheets

FURNACE EXPANSION JOINT WITH COMPRESSIBLE GRAPHITE JOINT FILLER AND MANUFACTURING METHOD

CROSS-REFERENCE TO RELATED APPLICATIONS

This is a continuation, under 35 U.S.C. §120, of copending International Application No. PCT/EP2005/013948, filed Dec. 22, 2005, which designated the United States; this application also claims the priority, under 35 U.S.C. §119, of European Patent Application EP 04 031 020.3, filed Dec. 30, 2004; the prior applications are herewith incorporated by reference in their entirety.

BACKGROUND OF THE INVENTION

Field of the Invention

The invention relates to expansion joints in side walls of reduction furnaces, more specifically in an upper part of a hearth wall lining in blast furnaces, being filled with a compressible graphite material. The invention also relates to a method of manufacturing such a joint filler.

Recently, blast furnaces have been scaled up and operated under more severe conditions. Damaging factors affecting the lining refractory materials have increased because of the trend toward high-pressure operation, pulverized coal injection operation and so on. Despite those circumstances, it is required to attain a longer service life of the furnaces. The service life of blast furnaces depends mostly on the durability of the lining of the side walls and bottom region of the blast furnace hearth. Carbon materials are overwhelmingly used as the lining material for portions of the sidewall and the bottom region of the blast furnace hearth.

An important issue affecting the service life of blast furnaces is thermal stress in the lining blocks of the blast furnace hearth. Upon blowing into a blast furnace, temperatures of up to 1500° C. are locally established at the surface of the linings inside the furnace. Since a free expansion of the separate blocks is not possible, because tuyères and cooling boxes in particular are anchored in the lining, considerable stresses are established, which can exceed the breaking strength of the blocks. That is a particular problem with furnaces having relatively large dimensions.

Furthermore, lately the hearths of blast furnaces are being built by using blocks with very precise dimensional tolerances, so that they can be placed seamlessly directly on top of each other without any circumferential (i.e. horizontal) joints. That approach has resulted in more efficient blast furnace assembly operations. However, it was found that due to the complex expansion behavior of the bricks upon the furnace heating-up, the vertical expansion of those bricks resulted in damage mainly around the tuyères.

It was therefore proposed in the 1990's to accommodate those vertical movements by an expansion joint located in the upper part of the hearth. Such expansion joints are preferably implemented by using units of two lining blocks with a "Z-design", including one horizontal joint with a joint filler on top of the brick radially extending towards the furnace chamber, a vertical joint between the bricks without filler, and another horizontal joint with a joint filler below the brick radially extending towards the furnace wall. That design and the location of the expansion joint can be found in several variations depending on furnace dimensions and other parameters. Typically, the two horizontal joints are 25 to 45 mm high to accommodate the large expansion of the seamless bricks at the furnace hearth.

In order to compensate for the thermal expansion of the lining blocks, it is known to use ramming pastes that contain mainly carbon and graphite particulates and a carbonaceous binder such as pitch or tar. It is also known that such pastes are subject to ageing processes and loose their compressibility and thus their ability to compensate for thermal expansion. Further, such ramming pastes are increasingly in the focus of environmental considerations because they emit benzenes and other poly-aromatic hydrocarbons (PAHs). Additionally, the ramming paste material does not show elastic behavior once temperatures reach well above 300° C., hence it only provides sealing upon heating up and operation of a furnace but does re-expand upon cooling of a furnace. Since a blast furnace is operated typically in a 3 to 5 bar CO-rich atmosphere, an uncontrolled cooling down of such furnaces leads to dangerous leakage in joints with high thermal contraction.

In the past, it has been attempted to place compressible asbestos sheets between the separate bricks in the zone of the shaft. However, such sheets or plates are not suitable for use in the hearth, bosh and wall batter of the stack, since the silicate material in the asbestos sheets speeds up the slagging of carbon or graphite blocks, is dissolved comparatively quickly in the iron and slag melt and in addition has a very low thermal conductivity.

It has thus been proposed to use compressible graphite foil instead of asbestos. Such graphite foil laminate plates are commercially available under the trademark SIGRAFLEX®. The plates are manufactured by compressing expanded natural graphite flakes under high pressure using calender rollers into a foil having a density of 0.5 to 1.5 g/cm$^3$ and a thickness between 0.1 and 2 mm. That is optionally followed by pressing a sandwich of the thus obtained foil and reinforcement material into plates having a thickness ranging between 0.5 and 4 mm.

In German Published, Non-Prosecuted Patent Application DE 22 40 886 A1, corresponding to UK Patent GB 1 389 367, it was proposed to place graphite foil laminate plates having a density of from 0.5 to 1.5 g/cm$^3$ in at least some of the joints between adjacent lining blocks in the furnace stack. The graphite foil laminate plates used in the stack linings have a thickness of 0.1 to 1.0%, relative to the dimension of the adjacent blocks extending perpendicularly to the plane of the plates. The graphite foil laminates were intended to absorb the thermal expansion of individual carbon-containing blocks used to line the blast furnace stack.

In a similar approach described in European Patent EP 0 300 064 B1 it has been suggested to prevent tuyères displacements or damage by lining them with plate-shaped compressible inserts being formed of a plurality of alternating layers of laminated graphite foil having a density of 0.5 to 1.5 g/cm$^3$ and metal sheets. The inserts are enveloped in copper foils and fixed to the furnace casing. The inserts were proposed to absorb the thermal expansion of the lining and protect the latter from steam.

The use of such graphite foil inserts was, however, never implemented in practice because the inserts were too costly and it was cumbersome to stack the foil inserts between the lining blocks. Further, it is often the case that specifically in critical joint areas, slight modifications can be required during furnace assembly. The above-described pre-manufactured foil-wrapped inserts can hardly be adjusted in size at the furnace assembly site.

In particular, as for the expansion joint in the upper part of the hearth wall lining, the gap between the lining blocks is typically 25 to 45 mm wide. Filling up that gap with conventional graphite foil sheets would require stacking up at least 15 such sheets.

SUMMARY OF THE INVENTION

It is accordingly an object of the invention to provide a furnace expansion joint with a compressible graphite joint filler and a manufacturing method, which overcome the hereinafore-mentioned disadvantages of the heretofore-known devices and methods of this general type and which provide a joint filler for the expansion joint in the upper part of the blast furnace hearth wall lining that is easy to handle, meets all physical and chemical requirements, and is cost effective to produce.

With the foregoing and other objects in view there is provided, in accordance with the invention, an expansion joint located in an upper part of hearth walls of a reduction furnace. The expansion joint comprises two lining blocks forming two horizontal gaps each having a height of 25 to 45 mm and a vertical seamless joint therebetween. A plate-shaped compressible graphite filler having a density of 0.1 to 0.2 g/cm$^3$ fills the horizontal gaps.

With the objects of the invention in view, there is also provided a method of assembling an expansion joint. The method comprises gluing the compressible graphite filler according to the invention to the respective lining blocks with suitable high-temperature glues, such as phenolic resin. The expansion joint is subsequently formed with the lining blocks.

The object of the invention is met by utilizing an expanded graphite pre-form as an expansion joint filler.

It is also an object of the invention to provide such an expanded graphite pre-form.

It is another object of the invention to provide a way of simplifying the configuration of the joint filler during furnace lining assembly.

Graphite foils are manufactured by compressing expanded natural graphite flakes. The treatment of raw natural flakes with a mixture of sulphuric and nitric acids yields so-called graphite intercalation compounds, i.e. the acid anions are embedded between the graphite layers. Subsequent heat treatment results in an accordion-like expansion of those flaky compounds with a carbon content above 99%. The thus generated expanded graphite pre-cursor material has a bulk density of only 2 to 7 mg/cm$^3$. It is finally compacted into dense foils having a density of 0.5 to 1.5 g/cm$^3$ by using calender rollers. Such foils are typically used as gaskets in the automotive and chemical industry.

One requirement for a joint filling material for the expansion joints in the upper part of the hearth wall lining of a blast furnace is the absence of plastic deformation under the weight of the lining. This translates into 0.2 MPa as the minimum pressure range. On the other hand, this material needs to be able to cope with pressures of 2 MPa that build up upon thermal expansion of the lining blocks. At that instance, the joint filling material is compressed by around 2 cm. It must be able to expand again when lower temperatures cause the lining blocks to contract. In addition, the vertical expansion of the lining at the side towards the hot furnace chamber is higher than at the cooler outer wall side. A suitable joint filler material must accommodate such differences. The durability of such joint filling material is of utmost importance in order to prevent damage to the furnace.

It has been found that compacting an expanded graphite precursor material to a less densified structure having a density of only 0.1 to 0.2 g/cm$^3$ yields a material perfectly suitable to fill the expansion joints above the hearth of a blast furnace.

Such material can be manufactured by placing an expanded graphite precursor material in the die of a conventional press and compressing it to the desired density. The same result can be achieved by calendering or a combination of compaction pressing and calendering.

In accordance with another feature of the invention, reinforcing loose carbon fibers or carbon fiber non-woven or woven mats can be implemented into the expanded graphite plates during the compression process.

In accordance with a further feature of the invention, the graphite filler plates are treated with known oxidation retarding agents typically based on phosphorus or boron compounds.

In accordance with an added feature of the invention, the joint filler is made of expanded graphite flakes further treated with polyphosphoric acid, as described in Published European Patent Application EP 1 120 378 A2, corresponding to U.S. Patent Application Publication No. US 2001/0018040 and U.S. Pat. No. 6,645,456. This treatment improves oxidation resistance of the expanded graphite plates at temperatures up to 350° C. and thus increases their durability and service life.

The compressed joint filler plates are preferably 1 cm thick. It is also possible to obtain plates of up to 3 cm in thickness.

In accordance with an additional feature of the invention, the other two dimensions can be varied depending on the compression equipment being used. Preferably, the plates are manufactured to the size required for the specific furnace construction. If not applicable, they may, however, be easily trimmed to the required size by usual cutting knifes directly at the assembly of the furnace lining.

In accordance with a concomitant feature of the invention, three of such plates, each 1 cm in thickness, need to be stacked for a typical expansion joint above the hearth. The plates are easy to handle but can also be glued to form a 3 cm high stack by using inexpensive high-temperature glues or adhesives such as phenolic resin or similar compounds. In order to even further ease handling during furnace lining assembly, this stack may also be fixed to the respective lining block with inexpensive high-temperature glues such as phenolic resin or similar compounds.

Other features which are considered as characteristic for the invention are set forth in the appended claims.

Although the invention is illustrated and described herein as embodied in a furnace expansion joint with a compressible graphite joint filler and a manufacturing method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
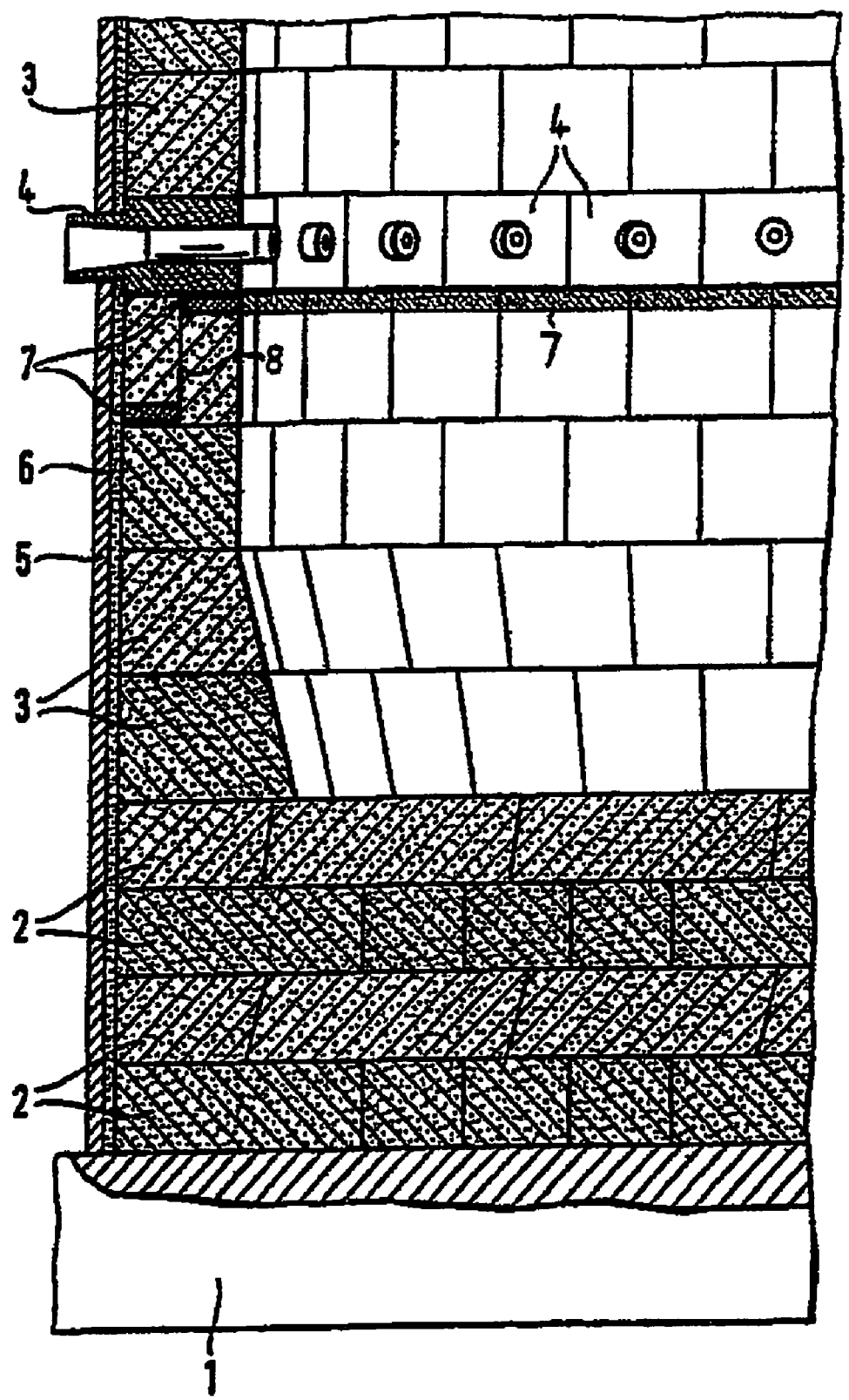
FIG. 1 is a diagrammatic, partly sectional, elevational view illustrating the construction of a blast furnace wall with an expansion joint according to the invention.

Referring now to the figures of the drawings in detail and first, particularly, to FIG. 1 thereof, there is seen a furnace which has a hearth base 1 with several layers of refractory blocks 2 on top forming a so-called hearth bottom. The hearth wall is built from lining blocks 3 made of carbon. A ring of tuyères 4 is fixed to a furnace shell 5 on top of the hearth wall. A space between the furnace shell 5 and the wall lining blocks 3 is filled with ramming paste 6. An expansion joint of the invention has a typical "Z-shape" including standard lining blocks 3 made of carbon forming an upper and a lower horizontal gap each of 25 to 45 mm in height being filled with a compressible graphite joint filler 7 and being in direct contact through a seamless vertical joint 8. The expansion joint forms a ring as indicated in FIG. 1. Depending on furnace dimensions and other construction parameters, the expansion joint can be located right below or several lining block 3 layers below the tuyères 4.

EXAMPLE

Expanded graphite pre-cursor material has been manufactured according to well known methods. That material was compacted at room temperature in a Laeis-Bucher press equipped with a molding die of 120×120 cm$^2$ at a pressure of 0.1 MPa for 5 min. The resulting plate had a density of 0.2 g/cm$^3$.

Several 10×10 cm$^2$ plates were cut out from the thus manufactured 1 cm thick joint filling material plate and their compression behavior was tested.

Figure 2:
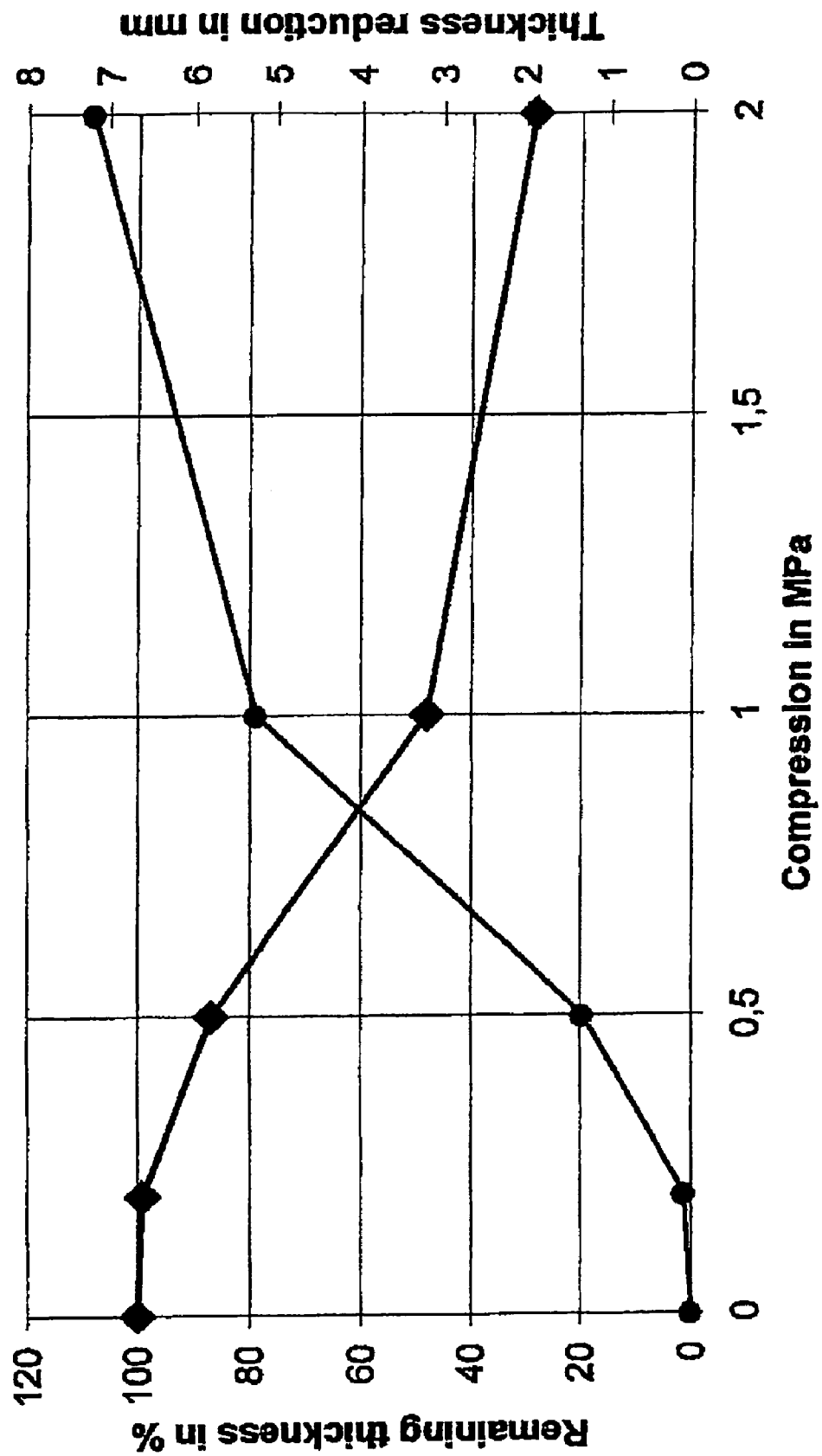
FIG. 2 is a graph showing the compression behavior of a plate made of the joint filling material according to the invention.

As can be seen in FIG. 2, no noticeable plastic deformation was observed at 0.2 MPa corresponding to the pressure generated by the weight of the lining blocks. At 2 MPa, the typical pressure on the joint filling material plate built up by thermal expansion of the lining blocks, the joint filling material plate was compressed by more than 7 mm. According to this result, a stack of three of such plates is sufficient to accommodate a compression of around 20 mm occurring in a 35 mm expansion joint between the lining blocks in the upper part of the hearth wall lining.

Several more plates of 120×120 cm$^2$ were manufactured in the described manner. Plates of 60×60 cm$^2$ were cut out and three each stacked together through the use of phenolic resin. Those joint filler plate stacks were accommodated in the expansion joint of a blast furnace and performed successfully.

Having thus described the presently preferred embodiments of this invention, it is to be understood that the invention may be otherwise embodied without departing from the spirit and scope of the following claims. It is specifically to be understood that, besides blast furnaces, the invention can also be used for other types of reduction furnaces having similar issues with thermal expansion of lining blocks.

The invention claimed is:

1. An expansion joint located in an upper part of hearth walls of a reduction furnace, the expansion joint consisting of:
    two lining blocks forming two horizontal gaps each having a height of 25 to 45 mm and a vertical seamless joint therebetween; and
    a plate-shaped compressible graphite filler having a density of 0.1 to 0.2 g/cm$^3$ obtained by compacting expanded graphite precursor material, said filler filling said horizontal gaps.

2. The expansion joint according to claim 1, wherein said compressible graphite filler includes a stack of up to five plates having a thickness of 0.5 to 1.5 cm.

3. The expansion joint according to claim 2, wherein said compressible graphite filler stack is cut to a required size and glued together by suitable high-temperature glues.

4. The expansion joint according to claim 3, wherein said high-temperature glues are phenolic resin.

5. A method of assembling an expansion joint, the method consisting of the following steps:
    gluing the compressible graphite filler according to claim 1 to the respective lining blocks with suitable high-temperature glues; and
    subsequently forming the expansion joint with the lining blocks.

6. The method according to claim 5, wherein the high-temperature glues are phenolic resin.

7. A method of manufacturing a compressible graphite filler, the method consisting of the following steps:
    compacting a conventional expanded graphite precursor material having a density of 2 to 7 mg/cm$^3$ to a desired density, by at least one of pressing in a conventional press or calandering; and
    trimming to final dimensions following the compacting step to form the compressible graphite filler according to claim 1.

8. The method of manufacturing a compressible graphite filler according to claim 7, which further comprises implementing reinforcing carbon fibers or carbon fiber non-woven or woven mats into the conventional expanded graphite precursor material before compressing.

9. The method of manufacturing a compressible graphite filler according to claim 7, which further comprises further treating the graphite filler with oxidation retarding agents.

10. The method of manufacturing a compressible graphite filler according to claim 8, which further comprises further treating the graphite filler with oxidation retarding agents.

11. The method of manufacturing a compressible graphite filler according to claim 7, which further comprises further treating the expanded graphite precursor material with polyphosphoric acid before compressing.

12. The method of manufacturing a compressible graphite filler according to claim 8, which further comprises further treating the expanded graphite precursor material with polyphosphoric acid before compressing.

* * * * *